United States Patent [19]

Yatsunami et al.

[11] 3,972,411

[45] Aug. 3, 1976

[54] METHOD OF FEEDING GREEN PELLETS ONTO GRATE OF PRETREATMENT FURNACE IN THE PRODUCTION OF REDUCED PELLETS

[75] Inventors: Kazuharu Yatsunami; Satoru Miyakado; Katsuaki Shiohara; Tsuneo Kataoka, all of Fukuyama; Akira Honda, Yokohama, all of Japan

[73] Assignee: Nippon Kokan Kabushiki Kaisha, Tokyo, Japan

[22] Filed: Feb. 10, 1975

[21] Appl. No.: 548,526

[30] Foreign Application Priority Data
Feb. 27, 1974 Japan.................................. 49-22367

[52] U.S. Cl..................................... 198/37; 198/39; 214/18.2; 177/1; 177/121
[51] Int. Cl.² ........................................ G01G 11/08
[58] Field of Search ................... 198/37, 39, 68, 72, 198/101; 214/18.2; 177/1, 67, 119–121

[56] References Cited
UNITED STATES PATENTS

| | | | |
|---|---|---|---|
| 2,237,773 | 4/1941 | Van Voorhis..................... | 198/68 X |
| 2,553,719 | 5/1951 | Palmer, Jr........................... | 198/37 |
| 2,662,665 | 12/1953 | Harper............................... | 198/37 X |
| 2,800,399 | 7/1957 | King................................... | 198/37 X |
| 2,962,150 | 11/1960 | Haley et al......................... | 198/39 X |
| 3,149,734 | 9/1964 | Ilmoni............................... | 198/101 X |
| 3,190,381 | 6/1965 | Eberhardt et al................. | 198/39 X |
| 3,249,204 | 5/1966 | Coffaro et al...................... | 198/39 |
| 3,412,699 | 11/1968 | Culp et al. ........................... | 198/37 |
| 3,494,507 | 2/1970 | Ricciardi........................... | 198/39 X |
| 3,530,973 | 9/1970 | Rossi................................ | 198/101 X |

FOREIGN PATENTS OR APPLICATIONS

| | | | |
|---|---|---|---|
| 949,818 | 9/1956 | Germany ............................ | 198/101 |
| 808,928 | 7/1951 | Germany ............................ | 198/68 |
| 487,640 | 12/1929 | Germany ............................ | 198/68 |

*Primary Examiner*—Evon C. Blunk
*Assistant Examiner*—Richard K. Thomson
*Attorney, Agent, or Firm*—Flynn & Frishauf

[57] ABSTRACT

In the production of reduced pellets such as reduced iron pellets by the grate-kiln system for firing, a distributor and a belt conveyor provided with a weighing machine are arranged between a sieving machine that sieves produced green pellets to predetermined grain sizes and a travelling grate of a pretreatment furnace. The weight of green pellets fed from said sieving machine through said distributor onto said belt conveyor is continuously measured on said belt conveyor by means of said weighing machine, and a signal indicative of the measured value is fed back to said distributor. Said distributor operates in response to said signal and regulates the supply of green pellets so that the supply of green pellets to said belt conveyor, hence the supply of green pellets to said grate is kept constant. Said distributor is of such a construction as will not crush green pellets.

16 Claims, 3 Drawing Figures

{ 3,972,411 }

METHOD OF FEEDING GREEN PELLETS ONTO GRATE OF PRETREATMENT FURNACE IN THE PRODUCTION OF REDUCED PELLETS

FIELD OF THE INVENTION

This invention relates to a method of feeding a constant quantity of green pellets onto a grate of a pretreatment furnace in the production of reduced pellets such as reduced iron pellets by the grate-kiln system for firing.

BACKGROUND OF THE INVENTION

In the production of reduced pellets such as reduced iron pellets by the grate-kiln system for firing through the use of a facility comprising a pretreatment furnace composed of a drying zone, a preheating zone and a hardening zone and provided with a travelling grate, and a rotary kiln, the following methods are known as methods of feeding green pellets onto said grate of pretreatment furnace, namely:

a. A method comprising the steps of sieving produced green pellets to predetermined grain sizes, measuring continuously the weight of sieved green pellets by a weighing machine while said green pellets are on the way to said grate, feeding forward a signal indicative of the measured value to said grate, and changing the travelling speed of said grate after the lapse of a predetermined time, i.e., increasing the travelling speed of the grate when the measured value is larger than a standard value and decreasing the travelling speed of the grate when the measured value is smaller than the standard value.

b. Another method comprising the steps of storing temporarily green pellets, produced and sieved to predetermined grain sizes in the same manner as in (a) mentioned above, in a hopper provided immediately before the grate, feeding then green pellets from the lower part of the hopper onto the grate, continuously measuring the level of green pellets in said hopper, decreasing the travelling speed of the grate when the level is lower than a standard level, and decreasing the supply of material to the pelletizer when the level is higher than the standard level.

c. Still another method comprising the steps of feeding all of the green pellets, produced and sieved to predetermined grain sizes in the same manner as in (a) mentioned above, onto the grate, and changing the travelling speed of the grate in response to variations in the thickness of the layer of green pellets on the grate, i.e., increasing the travelling speed of the grate when the layer of the green pellets is thick, and decreasing the travelling speed of the grate when the layer of the green pellets is thin.

However, in the above-mentioned methods (a), (b) and (c), the travelling speed of the grate changes so frequently that the time required for drying, preheating and hardening of green pellets in the pretreatment furnace varies to a great extent, disadvantageously resulting in complicated control of the pretreatment furnace and in unstable quality of reduced pellets obtained in the rotary kiln as well. Another disadvantage is observed in the case of the method (b) — green pellets stored in the hopper are liable to be crushed in the hopper because of their low crushing strength.

In view of the foregoing, although a method is required which feeds constant quantity of green pellets onto the grate of the pretreatment furnace in the production of reduced pellets by the grate-kiln system for firing, whereby the necessity for changing the travelling speed of the grate is avoided, such method has not so far been proposed.

SUMMARY OF THE INVENTION

Therefore, the principal object of this invention is to provide a method of compensating variations in the quantity of produced green pellets and thereby feeding a constant quantity of green pellets onto the travelling grate of a pretreatment furnace in the production of reduced pellets by the grate-kiln system for firing.

An object of this invention is to provide a method of feeding green pellets onto the grate so that the travelling grate of the pretreatment furnace can be always moved at a constant speed in the production of reduced pellets by the grate-kiln system for firing.

Another object of this invention is to provide a method of feeding green pellets always keeping their regular shape onto the travelling grate of the pretreatment furnace in the production of reduced pellets by the grate-kiln system for firing.

This invention is characterized, in a method of feeding green pellets onto a travelling grate of a pretreatment furnace in order to produce reduced pellets by the grate-kiln system for firing, by arranging a distributor and a belt conveyor provided with a weighing machine between a sieving machine that sieves produced green pellets to predetermined grain sizes and said travelling grate of a pretreatment furnace; measuring continuously the weight of green pellets fed from said sieving machine through said distributor onto said belt conveyor by means of said weighing machine, while said green pellets are on said belt conveyor; feeding back a signal indicative of said measured value to said distributor; and operating said distributor in response to said signal so that the supply of green pellets to said grate is kept constant.

DETAILED DESCRIPTION OF THE PREFERRED EMBODIMENTS

The method of this invention comprises, in the production of reduced pellets such as reduced iron pellets by the grate-kiln system for firing, arranging a distributor and a belt conveyor provided with a weighing machine between a sieving machine that sieves produced green pellets to predetermined grain sizes and a travelling grate of a pretreatment furnace, measuring continuously the weight of green pellets travelling on said belt conveyor by means of said weighing machine, feeding back a signal indicative of said measured value to said distributor, and operating said distributor in response to said signal thereby keeping the supply of green pellets from said distributor to said grate constant. The method of this invention is described below in detail with reference to the accompanying drawings.

Figure 1:
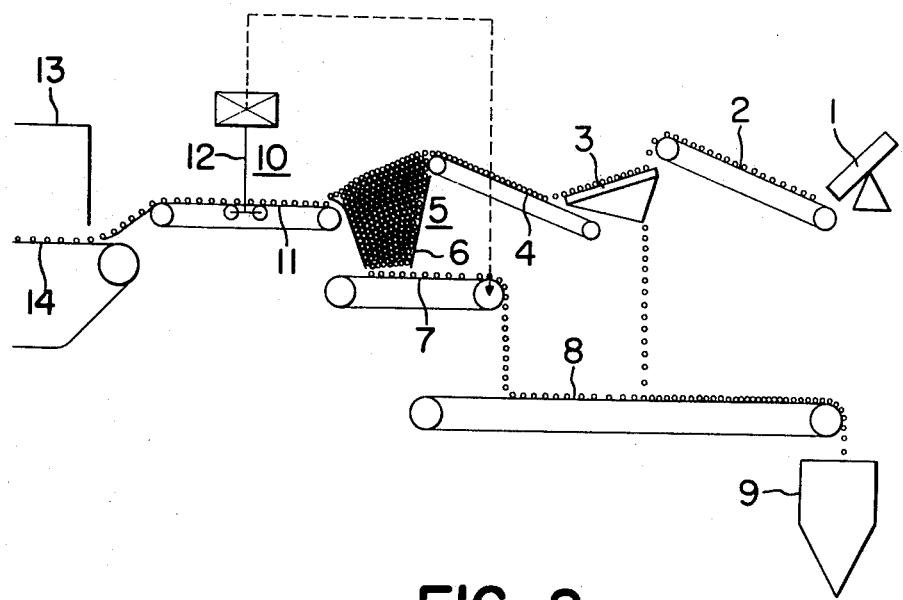
FIG. 1 is a schematic illustration of a facility in which this invention is applied.

FIG. 1 is a schematic illustration of one example of a facility in which this invention is applied. In the figure, 1 designates a pelletizer, for example, a disk type pelletizer, where green pellets are produced. 2 designates a belt conveyor for transferring green pellets produced by said pelletizer 1 to a sieving machine. 3 designates a sieving machine, where green pellets transferred from said pelletizer 1 are sieved to predetermined grain sizes. 4 designates a belt conveyor for feeding green pellets with predetermined grain sizes sieved by said sieving machine 3 to a distributor. 5 designates a distributor, which comprises a hopper and a control belt conveyor. 6 designates a hopper of said distributor 5, the wall of which, as shown in the figure, is lower on the delivery side for green pellets, than on the entering side for green pellets, and in the lower part of which a discharge opening for green pellets is provided. Green pellets charged by said belt conveyor 4 into said hopper 6 fill said hopper 6 and then flow over the wall on the delivery side onto a belt conveyor provided with a weighing machine. 7 designates a control belt conveyor of said distributor 5 and is provided immediately beneath said discharge opening in the lower part of said hopper 6. Said control belt conveyor 7 is adapted to operate in response to a signal indicative of a measured value of the weight of green pellets from the weighing machine, which will be described below, and to change the travelling speed. More specifically, when said measured value is larger than a predetermined standard value, the travelling speed of said control belt conveyor 7 increases and the discharge quantity of green pellets from said discharge opening in the lower part of said hopper 6 increases, as a result of which the overflow quantity of green pellets from said hopper 6 onto said belt conveyor provided with the weighing machine decreases. On the contrary, when said measured value is smaller than the predetermined value, the travelling speed of said control belt conveyor 7 decreases and the discharge quantity of green pellets from said discharge opening in the lower part of said hopper 6 decreases, as a result of which the overflow quantity of green pellets from said hopper 6 onto said belt conveyor provided with the weighing machine increases. 8 designates a return belt conveyor that transfers green pellets discharged by said control belt conveyor 7 and green pellets with unsuitable grain sizes removed by said sieving machine 3 to a return hopper for storing return green pellets. 9 is a return hopper, where return green pellets are collected and are returned as a material for green pellets. 10 designates a belt conveyor provided with a weighing machine, which comprises a belt conveyor and a weighing machine. 11 designates a belt conveyor, which is provided adjacent to the wall of said hopper 6 on the delivery side for green pellets, for receiving green pellets which have flown from said hopper 6 and transferring said green pellets onto a grate. 12 designates a weighing machine, which measures continuously the weight of green pellets on said belt conveyor 11, and a signal indicative of the measured value is fed back to said control belt conveyor 7. As is mentioned above, when the measured value of green pellets given by said weighing machine 12 is larger than a standard value, said control belt conveyor 7 operates at a higher speed, whereas, when said measured value is smaller than the standard value, said control belt conveyor 7 operates at a lower speed. 13 designates a pretreatment furnace. 14 designates a travelling grate, which passes through said pretreatment furnace 13.

In the above-mentioned facility in which this invention is applied, green pellets are first produced by said pelletizer 1 such as a disk type pelletizer. Said produced green pellets are transferred by said conveyor 2 to said sieving machine 3, where said green pellets transferred from said pelletizer 1 are sieved by removing green pellets with unsuitable grain sizes and selecting green pellets with predetermined grain sizes. The removed green pellets with unsuitable grain sizes are transferred by said return belt conveyor 8 to said return hopper 9. The selected green pellets with predetermined grain sizes are fed by said belt conveyor 4 from the high wall of the hopper 6 of said distributor 5, fill said hopper 6, and flow over the low wall of the hopper 6 onto said belt conveyor 11. Accordingly, the topmost layer of green pellets in the hopper 6 overflows. Green pellets fed by said belt conveyor 11 onto said travelling grate 14 of said pretreatment furnace 13 are these green pellets that have overflown, and these green pellets that have overflown are continuously weighed by said weighing machine 12 on said belt conveyor 11 prior to being fed onto said grate 14. A signal indicative of said measured value is fed back to said control belt conveyor 7 of said distributor 5, whereby, as described hereinbefore, the overflow quantity of green pellets onto said belt conveyor 11, hence the supply of green pellets to said grate 14 is kept constant. Surplus green pellets discharged from the discharge opening in the lower part of said hopper 6 are transferred, together with green pellets with unsuitable grain sizes removed by said sieving machine 3, by said return belt conveyor 8 to said return hopper 9 and are returned as a material for green pellets.

Figure 2:
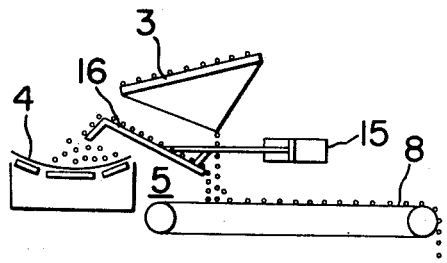
FIG. 2 is a schematic illustration of the principal part of another facility in which this invention is applied.
Figure 3:
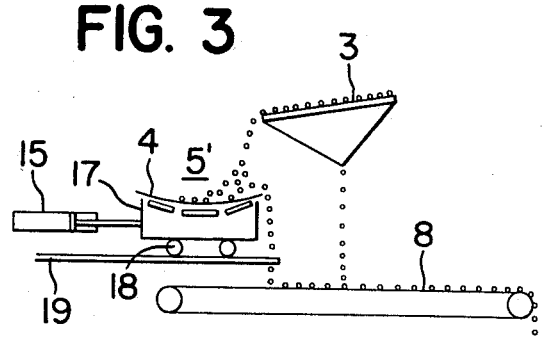
FIG. 3 is a schematic illustration of the principal part of still another facility in which this invention is applied.

Said distributor may be of a type shown in FIG. 2 or FIG. 3, in addition to the type comprising said hopper 5 and said control belt conveyor 7 as mentioned above according to FIG. 1.

The distributor 5 shown in FIG. 2 is arranged between a sieving machine 3 and a belt conveyor 4 disposed in above-and-below positional relationship and comprises a distributing plate 16 having an inclined surface of an inverted-V cross section and a hydraulic cylinder 15 causing said distributing plate 16 to move from side to side in the drawing. As described with reference to FIG. 1, green pellets on said belt conveyor 11 is continuously weighed by said weighing machine 12, and a signal indicative of the measured value is fed back to said hydraulic cylinder 15. Said hydraulic cylinder 15 causes said distributing plate 16 to move so that the ridgeline thereof moves from side to side in the drawing, thereby the supply of green pellets to said belt conveyor 4, hence the supply of green pellets to said belt conveyor 11, hence the supply of green pellets to said grate 14 is regulated to be kept constant. Surplus green pellets that fall down along the right side of said distributing plate 16 outside said belt conveyor 4 and green pellets with unsuitable grain sizes removed by said sieving machine 3 are transferred by said return belt conveyor 8 to said return hopper 9 and are reused as a material for green pellets.

The distributor 5 shown in FIG. 3 uses a belt conveyor 4 as a part thereof; that is, the distributor 5 in FIG. 3 comprises a belt conveyor 4, a stand 17 with wheels 18 for said belt conveyor 4, and a hydraulic cylinder 15 fixed to said stand 17. As described with reference to FIG. 2, green pellets on said belt conveyor 11 is continuously weighed by said weighing machine 12, and a signal indicative of the measured value is fed back to said hydraulic cylinder 15. Said hydraulic cylinder 15 causes said belt conveyor 4 to move on a rail 19 from side to side in the drawing, supply of green pellets to said belt conveyor 4, hence the supply of green pellets to said belt conveyor 11, hence the supply of green pellets to said grate 14 is regulated to be kept constant. Surplus green pellets that fall down outside said belt conveyor 4 and green pellets with unsuitable grain sizes removed by said sieving machine 3 are transferred by said return belt conveyor 8 to said return hopper 9 and are reused as a material for green pellets.

According to the method of this invention as mentioned above, since the supply of green pellets to said grate is kept constant by the cooperation of said distributor and said belt conveyor provided with the weighing machine, there is no necessity for changing the travelling speed of the grate. Accordingly, since the time required for drying, preheating and hardening of green pellets in the pretreatment furnace does not vary, a stable operation for the production of reduced pellets is maintained and reduced pellets with an always stable quality can be produced. Moreover, since green pellets fed onto the grate will not be crushed, reduced pellets having their regular shape are always produced, thus producing industrially useful effect.

What is claimed is:

1. A method of feeding green pellets onto a travelling grate (14) of a pretreatment furnace (13) in the production of reduced pellets by the grate-kiln system for firing, comprising:
   feeding green pellets from a sieving means (3) to a distributor hopper (6) at a given level;
   feeding said green pellets from said hopper (6), at a lower level than said given level at which said green pellets are fed to said hopper (6), to a first belt conveyor (11) provided with a weighing machine (12);
   feeding said green pellets from said first belt conveyor (11) to said grate (14);
   continuously measuring, by means of said weighing machine (12), the weight of said green pellets fed onto said first belt conveyor (11) while said green pellets are on said first belt conveyor (11);
   discharging green pellets from a bottom outlet of said hopper (6), which bottom outlet is located at a level below said lower level which said green pellets are fed to said first belt conveyor (11), onto a second belt conveyor means (7) which is located below said bottom outlet of said hopper; and
   varying the operating speed of said second belt conveyor means (7) as a function of said measured value to maintain a substantially constant supply of said green pellets to said grate (14).

2. The method of claim 1, wherein said hopper has a first wall and a second wall which has an upper level lower than the upper level of said first wall, comprising feeding said green pellets from said sieving means (3) over said first wall, and feeding said green pellets from said hopper (6) to said first belt conveyor (11) over said second wall.

3. The method of claim 2, wherein said hopper is generally V-shaped with a bottom opening below the upper levels of said first and second walls, and comprising discharging said green pellets from said bottom opening onto said second belt conveyor means (7) so as to maintain the amount of green pellets fed to said first belt conveyor (11) over said second wall substantially constant.

4. The method of claim 3, comprising locating said second belt conveyor means (7) below said bottom opening of said hopper so as to substantially block said bottom opening, whereby the quantity of green pellets discharged from said bottom opening is a function of the operating speed of said second belt conveyor means (7).

5. The method of claim 1, comprising locating said second belt conveyor means (7) below said bottom outlet of said hopper so as to substantially block said bottom outlet, whereby the quantity of green pellets discharged from said bottom outlet is a function of the operating speed of said second belt conveyor means (7).

6. A method of feeding green pellets onto a travelling grate (14) of a pretreatment furnace (13) in the production of reduced pellets by the grate-kiln system for firing, comprising:
   feeding green pellets from a sieving means (3) to a distributing plate (16) having an inclined surface of a generally inverted-V cross-section;
   feeding said green pellets from said distributing plate (16), at a lower level than the apex of the V of said inverted-V cross-section, and below the level at which said green pellets are fed to said distributing plate (16), to a first belt conveyor (11) provided with a weighing machine (12);
   feeding said green pellets from said first belt conveyor (11) to said grate (14);
   continuously measuring, by means of said weighing machine (12), the weight of said green pellets fed onto said first belt conveyor (11) while said green pellets are on said first belt conveyor (11);
   discharging green pellets along said inclined surface of said distributing plate (16); and
   moving said distributing plate (16) to move the apex thereof relative to said sieving means (3) as a function of said measured value to maintain a substantially constant supply of said green pellets to said grate (14).

7. The method of claim 6, wherein a hydraulic cylinder (15) is coupled to said distributing plate (16), and comprising operating said hydraulic cylinder (15) as a function of said measured value to correspondingly move said distributing plate (16) to maintain a substantially constant supply of green pellets to said grate (14).

8. The method of claim 6, comprising locating said distributing plate (16) so that the apex thereof is substantially below the outlet of said sieving means (3), whereby the amount of green pellets which are caused to be discharged along said inclined surface of said distributing plate (16) is varied as a function of the position of said distributing plate (16) relative to said sieving means (3).

9. The method of claim 6, comprising discharging green pellets along said inclined surface of said distributing plate (16) onto a second belt conveyor means (8) which is located below said inclined surface of said distributing plate (16) so as to convey green pellets away from said distributing plate (16).

10. A method of feeding green pellets onto a travelling grate (14) of a pretreatment furnace (13) in the production of reduced pellets by the grate-kiln system for firing, comprising:

feeding green pellets from a sieving means (3) to a distributor belt conveyor (4 — FIG. 3);

feeding said green pellets from said distributor belt conveyor (4) to a further belt conveyor (11) provided with a weighing machine (12);

feeding said green pellets from said further belt conveyor (11) to said grate (14);

continuously measuring, by means of said weighing machine (12), the weight of said green pellets fed onto said further belt conveyor (11) while said green pellets are on said further belt conveyor (11);

discharging green pellets from an edge of said distributor belt conveyor (4), at a level below the level at which said green pellets are fed from said sieving means (3); and moving said distributor belt conveyor (4) relative to said sieving means (3) as a function of said measured value to maintain a substantially constant supply of said green pellets to said grate (14).

11. The method of claim 10, comprising discharging green pellets from an edge of said distributor belt conveyor (4) onto a second belt conveyor means (8) which is located below said edge of said distributor belt conveyor (4) to convey green pellets away from said distributor belt conveyor (4).

12. The method of claim 10, comprising feeding green pellets from a longitudinal end of said distributor belt conveyor (4) onto said further belt conveyor (11).

13. The method of claim 10, wherein a hydraulic cylinder (15) is connected to said distributor belt conveyor (4), and comprising operating said hydraulic cylinder (15) as a function of said measured value to move said distributor relative to said sieving means (3).

14. The method of claim 10, comprising mounting said distributor belt conveyor (4) on a stand (17) having wheels (18), and moving said stand (17) as a function of said measured value.

15. The method of claim 10, wherein said step of discharging green pellets from said distributor belt conveyor (4) comprises discharging said green pellets from a side edge of said distributor belt conveyor (4).

16. The method of claim 11, wherein said step of discharging green pellets from said distributor belt conveyor (4) onto a second belt conveyor means (8) comprises discharging green pellets from a side edge of said distributor belt conveyor onto said second belt conveyor means.

* * * * *